Oct. 9, 1934.　　　O. VON BRONK　　　1,976,377
ELECTRIC PICTURE TRANSMISSION
Filed Jan. 28, 1930　　　2 Sheets-Sheet 1

INVENTOR
OTTO Von BRONK
BY
ATTORNEY

Oct. 9, 1934.　　　O. VON BRONK　　　1,976,377
ELECTRIC PICTURE TRANSMISSION
Filed Jan. 28, 1930　　　2 Sheets-Sheet 2
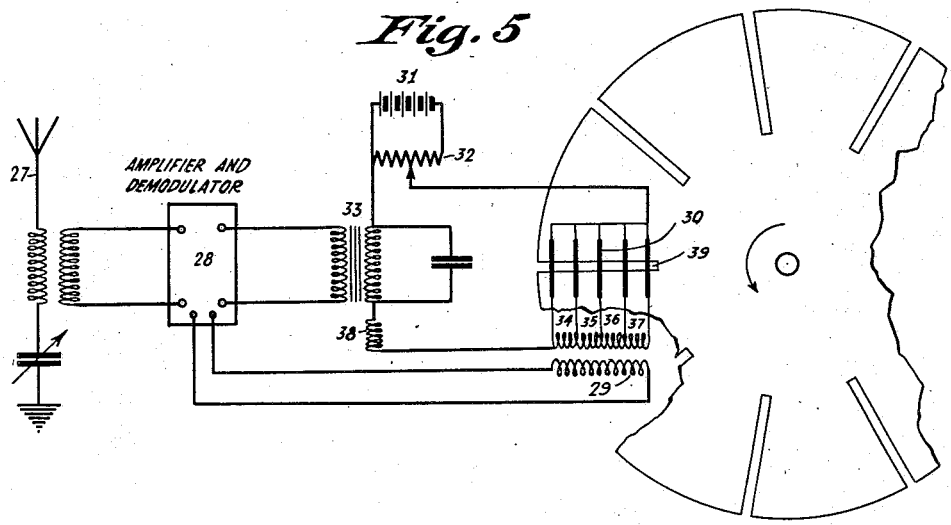
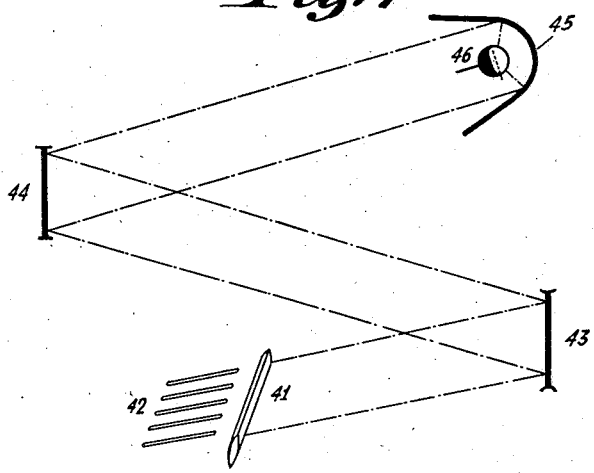
INVENTOR
OTTO Von BRONK
ATTORNEY Patented Oct. 9, 1934

1,976,377

UNITED STATES PATENT OFFICE

1,976,377

ELECTRIC PICTURE TRANSMISSION

Otto von Bronk, Berlin, Germany, assignor to Telefunken Gesellschaft fur Drahtlose Telegraphie m. b. H., Berlin, Germany, a corporation of Germany Application January 28, 1930, Serial No. 423,932
In Germany February 7, 1929

6 Claims. (Cl. 178—6)

By the disclosure of German Patent No. 450,454 an arrangement for electric picture transmission has become known in which the splitting up of the picture at the sending end of a transmission system and the synchronous assembling or re-creation at the receiving end is accomplished by means of an electrically controlled light analyzer. As example of a means for transmitting messages is shown in the above named German patent which consists of a multiple Kerr cell whose individual slots are influenced in successive order by electric potentials. The potential influence, different with respect to time, is in this case accomplished by means of electric retarding devices, as for instance by ohmic or inductive resistances, in the manner that an electric current impulse opens optically the individual slots of the Kerr cell in successive order.

The present invention likewise preferably uses for the picture dissection or decomposition and composition or re-creation the retarding means of the general type disclosed by the above named German patent and acting purely electrically. However, by my present invention the use of polarized light is not required either at the sending end or at the receiving end of the system. This simplification is made possible by the fact that instead of a Kerr cell an analyzer, consisting of gaseous conduction lamps or glow lamps, is made use of. The use of glow discharge lamps has, compared with the Kerr cell in such a system, the further advantage that a much better utilization of the light is accomplished. For the construction of such a glow discharge screen in the form of a blue glow analyzer capillary blue glow discharge tubes filled with intensively shining or luminescent gases are found especially suitable.

Further, as an object of my invention I have sought to provide a method and means by which the system of analyzing and reproducing subjects such as pictures and the like, and motion picture films, with or without sound accompaniments, for example, may be materially simplified and at the same time capable of producing true representations thereof at the receiving end of the system.

Other objects are to provide a method and the apparatus which is relatively simple in its construction and arrangement of parts, a system which is substantially foolproof, a system which may be readily set up and utilized with a minimum space requirement and in which the parts producing operation are least liable to need replacement.

Other objects, of course, will become apparent upon reading the following specification and claims in connection with the accompanying drawings wherein:—

Fig. 1 schematically illustrates the members of transmission, according to my present invention;

Fig. 2 more particularly illustrates the members of the invention as applied to the transmission of motion picture film;

Fig. 5 illustrates in schematic form a receiving system capable of use with a transmitter of the type shown by Fig. 4;

Fig. 6 illustrates a color filter suitable for use with any of the above named showings; and, Fig. 7 illustrates an application of the invention to the transmission of opaque subjects in contrast to the transparent or semi-transparent subjects shown by Figs. 1-5, for example.

Figure 1:
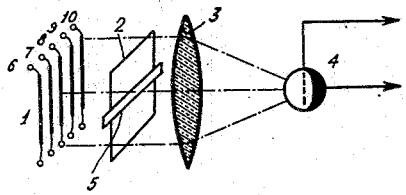

Referring now to the drawing, and first to Fig. 1 thereof, which, as above stated, represents in schematic manner a picture transmitting arrangement according to the present invention, the numeral 1 denotes a glow lamp analyzer which, to give a clearer understanding and by way of illustrative, but not limiting, example is shown as consisting of only five glow lamps, while up to a hundred glow lamps must be used according to the degree of fineness of the picture to be transmitted. Numeral 2 represents the picture to be transmitted, while 3 a collecting lens and 4 the photocell used for converting the changes in intensity of light and shadow on the picture surface into corresponding and proportionate changes in electric energy. 5 is a small slotted shutter which is used for the dissection of the second picture component.

It is evident that with a quick succession of the ignition of the glow discharge lamps, 6—10 which are ignited one after the other, and with a corresponding slower movement of the slot 5 in vertical direction (10 to 16 times per second) the light intensity values of all points of the picture plane 2 reach the photocell 4 in successive order via the lens 3. The movement of the slot 5 may be accomplished for instance by making use, in the manner known in the prior art, of a rotating slotted shutter in which the slits, which have a radial direction, are disposed along the circumference of a disk.

Figure 2:
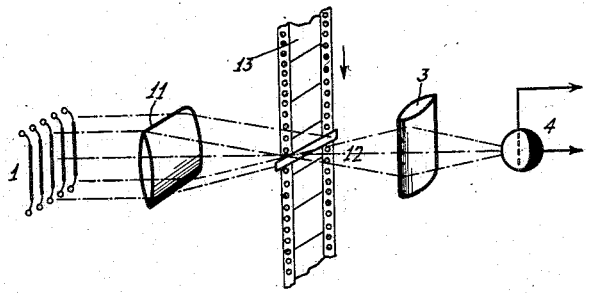
Figure 3:
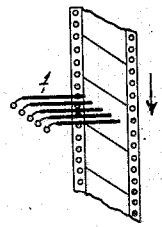
Fig. 3 illustrates a modification of the arrangements shown by Fig. 2 wherein a point source glow discharge lamp bank is substituted for the type shown by Fig. 2.

It is not required in all cases that the slot 5 moves itself. In the transmission of cinematographic films, as shown in Fig. 2, a cylindrical lens 11 may be employed, which projects the light of the glow lamp analyzer 1 in a small line 12 on the moving film 13. In this case the dissection of the one picture component is accomplished by means of the movement of the film 13. In such an arrangement the glow lamp analyzer 1 does not have to fill out the entire plane of the picture. Also point-glow lamps may be used as shown in Fig. 3.

Figure 4:
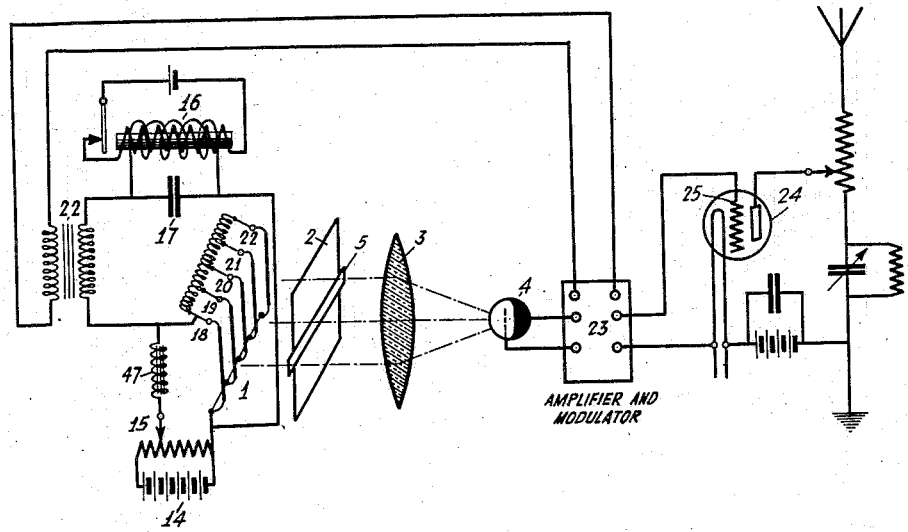
Fig. 4 shows in a conventional manner one type of film transmitting system used in connection with the arrangements set forth by Figures 1 to 3 inclusive.

Fig. 4 shows schematically an arrangement of the above described type of picture transmitter according to the present invention wherein 1 designates the glow lamp analyzer, 2 the plane of the picture, 5 the slotted shutter, 3 a collecting lens and 4 the photo-electric cell. The glow discharge lamp analyzer or screen 1 is supplied with current by the operating battery 14 and the current may be adjusted by means of potentiometer 15 in such manner that the glow lamps remain dim or dark for the time being. In this case the ignition voltage may either not have been reached as yet or the glow is limited to a very small part of the cathodes. The final luminous voltage causing luminescence is only obtained by means of inductor or spark coil 16 which serves to charge the condenser 17.

The conductors of the inductor 16 do not lead directly to the individual glow lamps of the analyzer or screen 1 but are connected by way of the low or audio frequency transformer 22 and through resistances 18, 19, 20 and 21. In this manner the individual glow discharge lamps are not brought, all at the same time, to maximum luminosity or to the flashing point, but successively one after the other, thereby insuring the picture decomposition or dissection, as set forth above, and it is in this manner that the corresponding illumination of the photocell 4 is controlled according to the various degrees or changes of brightness or varying intensities of light and shadow of the picture 2. The high frequency currents of the photo-electric cell 4 may then be used, through the amplifier and modulator 23, for influencing the carrier wave of the tube transmitter 24.

At the same time that the carrier wave sent out from the transmitter 24 is modulated by picture energy, it is also modulated by the ignition frequency of inductor or spark coil 16 which may amount, with 10,000 picture points, for example, to about 1000 per second. This is accomplished by means of the low or audio frequency transformer 22 whose secondary potentials act upon the grid 25 of the transmitter tube 24 by way of the modulator 23.

For the sake of simplicity of illustration a common modulator 23 is shown in Fig. 4 for the low frequency ignition frequency as well as for the high frequency photocell frequency. However, for practical purposes it serves the purpose best to use separate amplifiers for the two separate frequencies.

The carrier wave, radiated from the antenna 26 and modulated in the above described manner is then transmitted to be received by a suitable receiving arrangement, for example a receiver of the type shown by Fig. 5 in a diagrammatic manner. Here the oscillations received by the antenna 27 are first amplified and demodulated by the receiver 28 in any desired manner such as is well known in the prior art. The higher frequency, originating from the photocell 4 from the light changes on the picture, is conveyed through high frequency transformer 29 in the manner indicated in the drawings to the glow discharge lamp screen or analyzer 30, which is supplied with appropriate bias voltage by the biasing battery 31. As was described in connection with the transmitter, the effective potential of battery 31 upon the glow discharge lamp screen or analyzer may be regulated and adjusted by means of a potentiometer 32. The ignition frequency, rectified by the receiver 28, also reaches, through the low frequency transformer 33, the high or radio frequency choke 38 and the retardation coils 34, 35, 36 and 37, which are at the same time the secondary of the high frequency transformer 29, the individual lamps of the glow discharge lamp screen or analyzer 30. The ignition impulses will, due to the fact that the resistances 34 to 37 have the same size as the corresponding resistances of the transmitter, experience an equal retardation, while the photocurrents could influence the glow lamps all at the same time if the glow lamps would be ignited all at the same time. However, since, as may be realized when giving the matter due thought, the ignition voltages do not occur, due to the retardation resistances at the individual glow lamps, simultaneously, the influence of the photo-electric currents will always only manifest themselves in those particular glow discharge lamps in which the ignition potentials have just reached their maximum or crest value. When now the slot 39 moves synchronously with the slot 5 of the transmitting station according to Fig. 4, the picture of the sender will be reproduced at the receiver.

The number of the glow tubes is, as previously stated, a function of the number of picture points to be transmitted in the unit of time. When splitting up a picture in 10,000 minute squares the analyzer would have to be provided with 100 glow tubes. It is, however, possible to reduce the number of glow tubes to 50 or even 25, maintaining the above number of picture points, if the width of the slots 5 and 39 is reduced to ½ or even ¼ of the width of the glow discharge lamp screen or analyzer, although in this case rectangles are obtained instead of squares.

For the synchronization of the rotating slotted disk at the receiving end no control from the sending end is required since the synchronism of the one picture component is assured in the manner that the adjustment of the slotted disk may be accomplished by means of a clock mechanism or electric motor as in the case of a gramophone disk. It is, however, possible to employ, instead of the slotted disk, an oscillating mirror controlled by the transmitter.

By using a three-colored filter (red, green and blue) according to Fig. 6 instead of the slotted shutters the picture transmission in natural colors is made possible. By trebling the number of glow lamps, multi-colored tubes (red, green and blue), that is glowing in these colors, may be employed for this purpose.

It is a matter of course that in the new method as described above for the transmission of pictures all measures may be made use of, as far as required, which correspond to the state of the radio frequency art technic. For instance, chokes, condensers and blocking circuits may be inserted at all required places for the purpose of separating and blocking the ignition frequencies and the photocell frequencies, since these frequencies are widely separated one from the other. For instance there is required in Fig. 4 a low frequency choke 47 and in Fig. 5 a high frequency choke 38. In similar manner, wherever unequal voltages occur equalization or compensation may be insured by resistances or similar means.

Not only transparent pictures may be transmitted by means of this new method but also opaque ones. All that is required in this case, as may be seen from Fig. 7, is that the light from the glow discharge lamp screen or analyzer 42, controlled according to the present invention, is condensed by the cylindrical lens system 41 into a narrow line of light which is then passed through a moving slotted shutter or is reflected from a moving oscillating mirror 43 before it illuminates the object 44 to be transmitted. The light of an object, illuminated in such manner intermittently, may be collected or caught by the photocell 46, disposed in the focal line of the parabolic mirror 45, and the photo-electric currents may be utilized for the control of the transmitter according to Fig. 4.

From the above description, it is apparent that many modifications and changes can be made in this system without departing from the spirit or scope of the invention and I therefore believe myself to be entitled to make and use any and all of these modifications such as would suggest themselves to those skilled in the art to which the invention relates, and such as fall fairly within the spirit and scope thereof as set forth by the hereinafter appended claims.

Having now described my invention, what I claim and desire to secure Letters Patent is the following:

1. In a system for the transmission of visible records, the combination of a plurality of glow discharge lamps for illuminating successive elemental areas of the record, electrical operating retardation means connected with the glow lamps, said means including impedance elements for causing the glow discharge lamps to become successively illuminated for scanning the record surface in one direction, secondary scanning means cooperating with the discharge lamps for causing the record to be scanned in a second direction at substantially right angles to the direction of scanning of said glow lamps, a transmitter for transmitting energy proportionate to the intensity of light and shadow on the record surface scanned, and means for impressing upon the transmitter energy corresponding to the rate of successive illumination of said glow lamps so as to provide for synchronizing the operation of a suitable receiver coordinated therewith.

2. In a system for the transmission of a continuously moving motion picture film or the like, a bank of glow lamps arranged adjacent to said picture film, an electrical circuit including distributed inductance and capacity connected with the glow lamps so as to cause the said lamps to become successively illuminated when current is passed through said circuit, means for projecting light issuing from said lamps along a line transverse to the line of motion of the picture film, means for converting the varying intensities of light and shadow on elemental areas of the picture film into proportionately varied electrical energy, and means for transmitting said energy.

3. In a receiving system for receiving signals corresponding to transmitted picture subjects, a receiver device, the combination of a plurality of elongated glow lamps arranged adjacent each other, an electrical circuit including impedance elements connected with the glow lamps for successively causing the illumination of said glow lamps in accordance with received signaling impulses representing successive elemental areas of a transmitted picture, and means for causing the light produced from said glow lamps to become effective throughout a series of successive lines at right angles to the normal path of illumination of said glow lamps.

4. In a receiving system for receiving pictures transmitted thereto from a suitable transmitting station having means for converting intensities of light and shadow on elemental areas of a transmitted record surface into electrical impulses and means for transmitting a signal corresponding to the rate of conversion of light on elemental areas of the picture into electrical current impulses, the combination of means for receiving signals, a bank of illuminating means arranged adjacent each other, an electrical circuit including impedance elements connected with said elements for successively causing the illumination of said means at a rate corresponding to the rate of scanning of the record subject in one direction at the coordinated transmitter, means for causing a visual reproduction of the illumination of said illuminating means along successive parallel paths at substantially right angles to the plane of said illuminating means.

5. In combination, a plurality of elongated illumination sources arranged substantially parallel to each other for illuminating a picture subject for transmission, electrical means including impedance elements for causing successive illuminations of each of the said sources at a predetermined rate, means for converting intensities of light and shadow of said picture subject as determined by said illumination of said light sources into varying strength electric current impulses, means for transmitting signals, means for modulating the transmitting means by signals corresponding to the intensity of light and shadow on the picture subject transmitted and means for simultaneously modulating said transmitting means by signals corresponding to the successive rate of illumination of the said illuminating means.

6. In combination with the transmitter system as claimed in claim 5, a receiving means including a plurality of elongated parallelly arranged sources of illumination, means for illuminating said sources in accordance with signals received from the said transmitting station and corresponding to the intensities of light and shadow on elemental areas of the transmitted picture subject, electrical means including impedance elements for controlling the succession of illumination of said sources in accordance with the rate of illumination of said sources at said transmitter, and means for producing reproductions of said illuminations in successive parallel paths at substantially right angles to the planes of said illuminating sources.

OTTO VON BRONK.